(No Model.) 6 Sheets—Sheet 2.

A. J. MASON & F. K. HOOVER.
APPARATUS FOR MAKING ARTIFICIAL EXCAVATIONS FOR WATER COURSES.

No. 592,658. Patented Oct. 26, 1897.

(No Model.) 6 Sheets—Sheet 3.

A. J. MASON & F. K. HOOVER.
APPARATUS FOR MAKING ARTIFICIAL EXCAVATIONS FOR WATER COURSES.

No. 592,658. Patented Oct. 26, 1897.

(No Model.) 6 Sheets—Sheet 4.
A. J. MASON & F. K. HOOVER.
APPARATUS FOR MAKING ARTIFICIAL EXCAVATIONS FOR WATER COURSES.
No. 592,658. Patented Oct. 26, 1897.

(No Model.) 6 Sheets—Sheet 5.

A. J. MASON & F. K. HOOVER.
APPARATUS FOR MAKING ARTIFICIAL EXCAVATIONS FOR WATER COURSES.

No. 592,658. Patented Oct. 26, 1897.

WITNESSES:

INVENTORS
Arthur J. Mason
Frank K. Hoover
BY
Edson Bros.
ATTORNEYS.

UNITED STATES PATENT OFFICE.

ARTHUR JOHN MASON AND FRANK KRYDER HOOVER, OF KANSAS CITY, MISSOURI.

APPARATUS FOR MAKING ARTIFICIAL EXCAVATIONS FOR WATER-COURSES.

SPECIFICATION forming part of Letters Patent No. 592,658, dated October 26, 1897.

Application filed May 15, 1896. Serial No. 591,713. (No model.)

*To all whom it may concern:*

Be it known that we, ARTHUR JOHN MASON and FRANK KRYDER HOOVER, citizens of the United States, residing at Kansas City, in the county of Jackson and State of Missouri, have invented certain new and useful Improvements in Apparatus for Making Artificial Excavations for Water-Courses; and we do hereby declare the following to be a full, clear, and exact description of the invention, such as will enable others skilled in the art to which it appertains to make and use the same.

Our invention relates, in part, to an apparatus for carrying into practice the "Method of making artificial excavations for watercourses" patented January 15, 1895, to Arthur J. Mason by United States Letters Patent No. 532,679.

Although our apparatus is well adapted for making excavations for water-courses in which the main conveyer is loaded automatically by the gravity of the material hurled down the end slope of the excavation, yet we do not wish to be understood as strictly confining the apparatus to this mode of loading the conveyer, because it may be loaded by power appliances or by manual labor at any point within the lines of the excavation. Nor do we wish to be understood as restricting ourselves to the use of the apparatus in watercourse excavations, because the apparatus, or at least parts of the same, is capable of use in excavating work generally.

The first part of our invention relates to a truss designed to span an excavation and mounted on cars or trucks which travel on suitable tracks, one of which cars is equipped with an engine, combined with a traveling conveyer carried by the truss and adapted to be driven by the engine on the truck or car for the purpose of conveying the material across the line of the excavation and depositing the same upon a dump, one section or length of said conveyer being suspended from the truss within the excavation to travel close to the bed or bottom thereof, and preferably adjacent to the foot or base of the sloping end face of said excavation, for the purpose of loading the conveyer automatically by dislodging the material from the sloping end face, down which the material falls by gravity, so as to be intercepted by the conveyer at the foot of the slope. It is to be understood, however, that while this arrangement is preferable the conveyer may be loaded by any other desired means or in other ways, if preferred.

Our invention further consists in the provision of means for effecting the vertical adjustment of the suspended length of the conveyer relatively to the bed of the excavation, and, further, in a novel construction of the conveyer with a view to making it tight against the egress of material with which it is loaded and to exclude lodgment of the material within the operative parts of the conveyer, thereby preventing clogging of the same.

Another leading feature of our invention consists in the provision of reversible plowing appliances operated primarily by a power-driven cable or line which is arranged to haul the plow back and forth across the sloping end face of the excavation, which plow is equipped with manually-operative devices for guiding and directing the course of the plow in the furrow, and it is also provided with gage-shoes that assist in regulating the depth and the lateral deflection of the plowshare. With this reversible plow drawn by power devices across the sloping face of the excavation we have combined means for adjusting the plowing line or cable at variable distances from the conveyer and for directing and controlling the position of the plowing line or cable in a way to insure the plow traveling in paths substantially parallel with the length of the conveyer and without reference to the distance of the plowing-line from the conveyer or the position of the plow upon the sloping end face of the excavation.

Another feature of our invention consists in the employment of a power-operated auxiliary carrier or conveyer intended for service in connection with the excavator or plow when engaged in loosening the material at the base of the sloping end face after the removal of the main body of the prism of material from said end face has been effected, which auxiliary carrier receives the material loosened from the base or foot of the slope and conveys the same to and deposits it upon the principal or main conveyer that deports the material to one side of the line of the excavation; and the invention further consists in the novel combination of devices and in the construction and arrangement of parts which will be hereinafter fully described and claimed.

We have illustrated one embodiment of our apparatus for making artificial excavations for water-courses in the accompanying drawings, forming a part of this specification, and in which—

Fig. 1ᴬ is a plan view of our apparatus and a portion of the excavation. Fig. 1ᴮ is an edge view of the apparatus and a sectional elevation through the sloping end face of the excavation, the shaded section 13ᵐ denoting the prism of material to be dislodged from the slope and deposited upon the conveyer adjacent to the vertical face 13ᵠ at the foot or base of the slope. Figs. 2ᴮ and 2ᶜ are edge and side elevations, respectively, of one form of sprocket wheel or drum for the end of the conveyer. Fig. 3ᴮ is a detail perspective view, on a reduced scale, of one conveyer-pan. Fig. 3ᶜ is a detail view of one of the bars forming a part of the conveyer-chain. Figs. 3ᴰ and 3ᴱ are side and plan views, respectively, of a modified construction of the conveyer-pan. Fig. 4ᴬ is a transverse section through the suspended part of the conveyer and track, showing the dirt-excluding plates, the suspension-cables, a barrier to prevent the descending soil bounding over the conveyer, and a yoke for service on the receiving side of the conveyer next to the slope. Fig. 5ᴬ is a rear elevation showing the plow in action on a "bench" in the sloping end face of the excavation. Figs. 5ᴮ and 5ᶜ are an elevation and plan view, respectively, of the auxiliary conveyer for the purpose of depositing on the primary conveyer the excised material loosened by the plow from the base or foot of the sloping end face of the excavation. Figs. 6ᴮ and 6ᶜ represent in side elevation and transverse section, respectively, a portion of a modified construction of the conveyer in which an endless belt of rubber fabric or other suitable material is supported on rollers in lieu of the articulated wheeled pan-conveyer.

Like numerals of reference denote corresponding parts in all the figures of the drawings.

Figures 1, 1A, 1B:
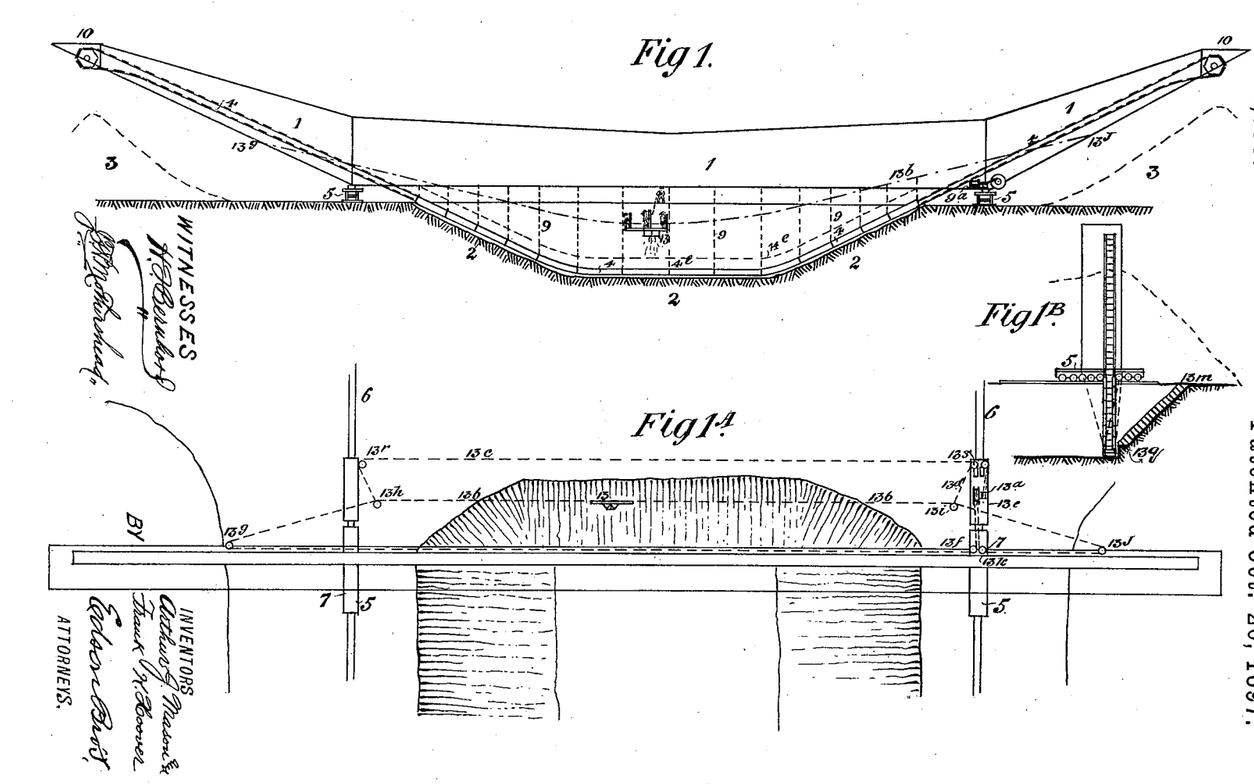
Figure 1 is a diagrammatic view illustrating our apparatus in side elevation and showing an excavation in cross-section.

In Figs. 1, 1ᴬ and 1ᴮ we have shown in a general way our apparatus in position across and within an artificial excavation for water-courses, in which excavation the end face is formed with a slope greater than the angle of repose of the material, while the sides incline upwardly and outwardly from the bed or bottom of the excavation.

Generally speaking, our apparatus consists of a truss 1, cars or trucks 5 5, tracks 6 6, and a traveling or endless conveyer 4, which is carried by the truss in a way to travel transversely to or approximately at right angles across the line or axis of the excavation and deposit the material beyond the sides of the excavation and upon the dumps or spoil-banks 3. (Indicated by dotted lines in Fig. 1.) The tracks 6 6 are laid on the surface beyond the sloping sides of the excavation and they are projected in advance of the end face thereof, (see Fig. 1ᴬ,) and to these tracks are adapted the wheeled cars or trucks 5 5, the latter carrying the truss 1.

On one of the cars 5 is mounted an engine 9ᵃ of any suitable construction, (see Fig. 1,) which engine serves to furnish the power, through rope transmission, to the sprocket-wheel or drum for driving the traveling conveyer 4, proper gearing being provided for reducing the speed of the power-transmitting rope to the desired speed for the conveyer 4. The truss is constructed with a cantaliver-arm (see Fig. 1) at one or both ends, according as it is desired to deposit the excised material upon dumps 3, beyond one or both sides of the excavation.

In Figs. 1 and 1ᴬ we have shown the truss constructed with two cantaliver-arms and the conveyer 4 as extending the full length of the truss and its said arms for the purpose of depositing the material upon one dump or the other according as the conveyer is driven by the engine to travel toward the right side or toward the left side of the excavation; but we would have it understood that the truss may be constructed with a cantaliver-arm at one end only for the purpose of depositing the material beyond one side of the excavation.

Figures 2, 2A, 2B, 2C, 3D:
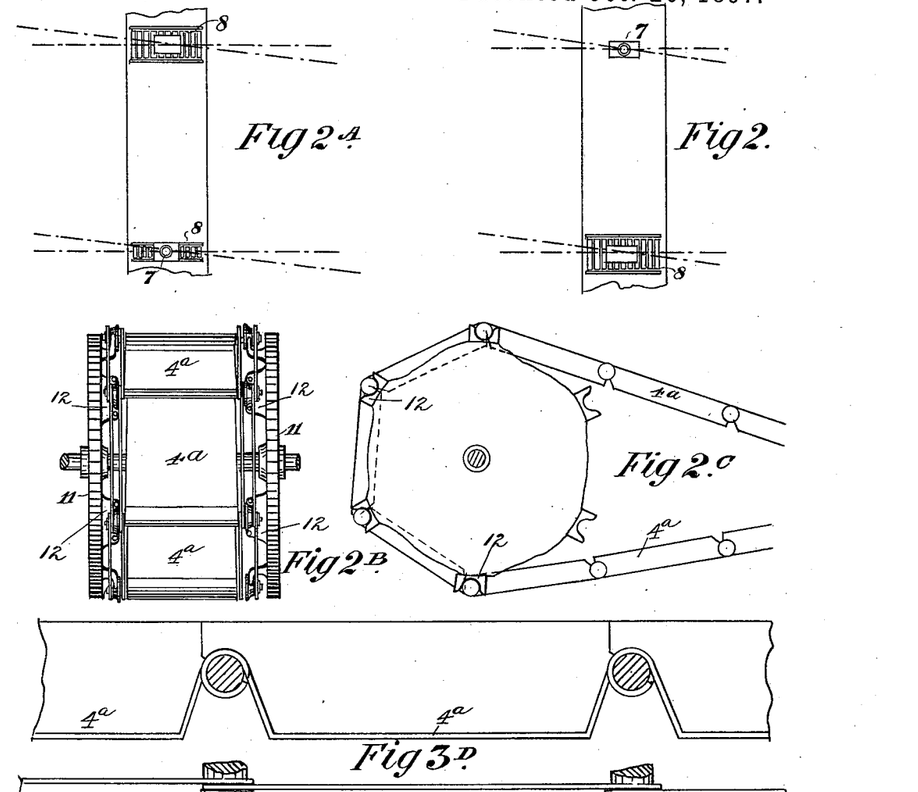
Figs. 2 and 2ᴬ are plan views of the cars for carrying the truss, showing the pivots and roller-carriages which permit the truss assuming positions not necessarily at right angles to the axes of the cars and tracks.

The truss 1, at the points where it rests upon the cars 5, is pivoted at the alternate corners of the cars and on opposite sides of the axial line of the truss, as indicated at 7 7 in Figs. 2 and 2ᴬ, and said truss rests at three points upon the roller carriages or frames 8 8 8 on the cars 5 5 in a manner customary in bridge construction to provide for the contraction and expansion of parts due to changes in temperature. The primary purpose of the pivots and roller-bearings is to permit the truss assuming positions not necessarily at right angles to the axis of the cars and tracks.

The conveyer 4 is suspended from the truss for a part of its length within the excavation, close to the bottom and one or both sloping sides of said excavation, and the remaining length of the conveyer is disposed close to the truss and its cantaliver arm or arms, as shown by Fig. 1.

In the construction of our apparatus with two cantaliver-arms at the respective ends of the truss the ends of the conveyer pass over the sprocket-wheels (indicated at 10 10 in Fig. 1,) which sprocket-wheels are carried by shafts suitably journaled in the outer ends of the cantaliver-arms. One form of the sprocket-wheels is shown by the enlarged detail views, Figs. 2$^B$ and 2$^C$ of the drawings, which illustrate the sprocket-wheel having a pitch corresponding to the articulation of the conveyer. As shown, the sprocket-wheel consists of disk-like heads 11 and the recessed bearings 12, arranged to receive the wheels on the axles which join pans of the endless conveyer.

Figure 3:
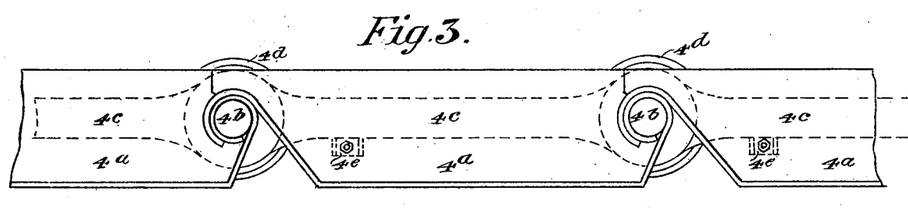
Figs. 3 and 3ᴬ are respectively a side elevation and plan view of one construction of articulated conveyer-pans.
Figures 3A, 3B, 3C:
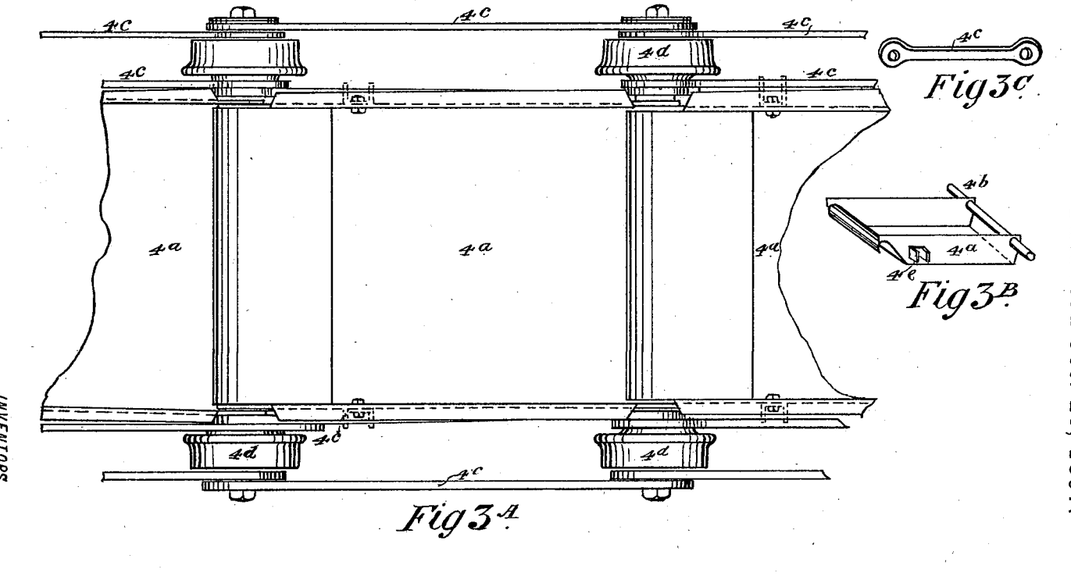
Figure 3E:
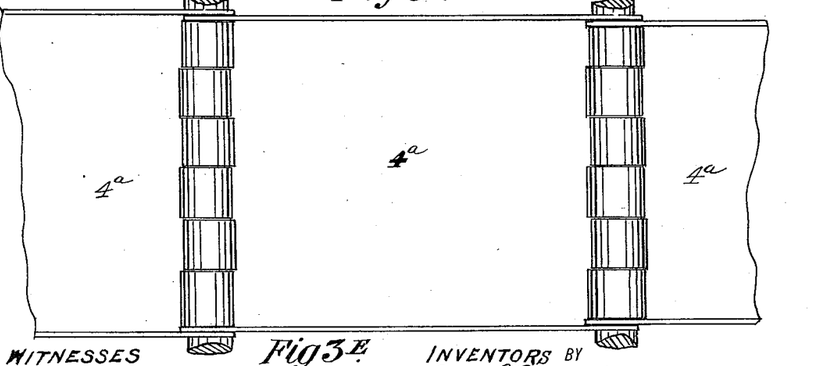

Briefly stated, the conveyer is an endless chain of articulated pans 4$^a$, four strands of links or eye-bars 4$^c$, and transverse wheeled axles 4$^d$, which connect the four strands of links and strengthen the articulated joints of the pans. The preferred form of our conveyer is shown by Figs. 3, 3$^A$, 3$^B$, and 3$^C$. Each pan is struck up from a sheet of suitable metal, with a bottom, two side walls, and with rolls or eyes at its opposite end, and each pan is made slightly wider at one end than at its opposite end for the purpose of nesting or projecting into an adjacent pan in a manner for the eyes or rolls of the series of pans to join or articulate, as shown by Figs. 3 and 3$^A$, thus articulating the pans in a manner to secure dirt-tight joints and give the necessary flexure in passing around curves and angles in the conveyer-track and the sprocket-wheels 10. Through the articulated joints formed by the rolls of the pans are passed the axles 4$^b$, the ends of which project beyond the sides of the pans for suitable distances to receive the flanged carrying-wheels 4$^d$ and the ends of the eye-bars or links 4$^c$, as more clearly shown by Fig. 3$^A$. There are four strands to the endless chain of our conveyer, two strands being on one side of the articulated pans and two strands on the opposite side of the series of pans, and each pair of strands is spaced to adapt the flanged carrying-wheels 4$^d$ to lie between them, whereby as the conveyer-chain passes around the sprocket-wheels the flanged carrying-wheels 4$^d$ are adapted to the recessed bearings 12 of the sprocket-wheels. The lateral movement of the conveyer in passing around the sprocket-wheels is prevented by the wheel-flanges and the form of the recessed bearings. Each link or eye-bar 4$^c$ of the conveyer fits on two adjacent axles, and the ends of two alined links in each strand overlap one another, as shown by Fig. 3$^A$. To prevent the pans from becoming unhinged and disconnected when returning empty and occupying an inverted position on the lower track, a clip or detent 4$^e$ is provided as an extra precaution, which clip 4$^e$ is fastened to the side of the pan and in position to touch or engage with one of the links or eye-bars 4$^c$, which lie close to the side of the pan. A modified construction of the conveyer-pans is illustrated by Figs. 3$^D$ and 3$^E$ of the drawings, in which embodiment the pans are hinged together by the axles, which pass through overlapping coincident eyes or loops formed on the ends of the pans.

Figure 6A:
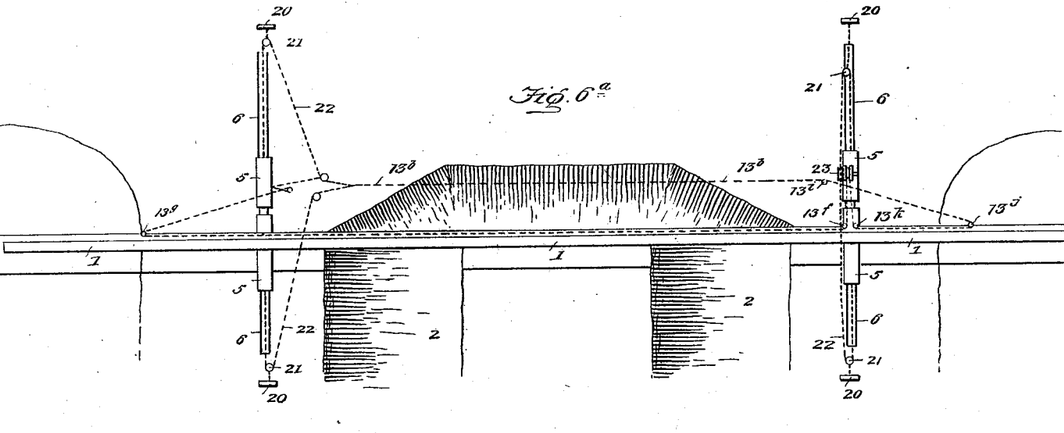
Fig. 6ᴬ is a plan view showing the haulage-cable adapted for use in connection with the block-and-tackle appliances and suitable anchors or "deadmen," the whole arranged in connection with the plowing-engine to move the truss and its contained conveyer in the general direction of the line of the excavation either forward or backward.
Figure 6B:
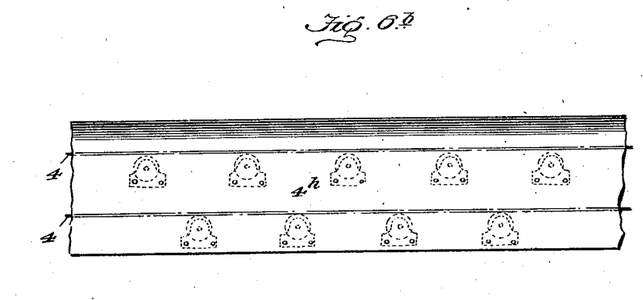
Figure 6C:
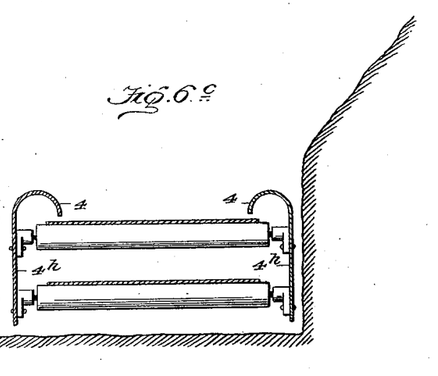

Although we have shown and described the conveyer in its preferred embodiment as consisting of articulated pans, yet we do not strictly confine ourselves to this type of conveyer. When the depth of the excavation is not great and the character of the material is such that it will not in descent unduly shock or jar the conveyer, we may use a rubber or other belt conveyer running upon rollers and housed within the shield-plates 4$^h$ for protection from interference from dirt, as shown in Figs. 6$^B$ and 6$^C$ of the drawings, said shield-plates 4$^h$ serving to protect the rubber or other belt conveyer in a way similar to the mode of protecting the articulated pan-conveyer, which will now be described.

Figure 4:
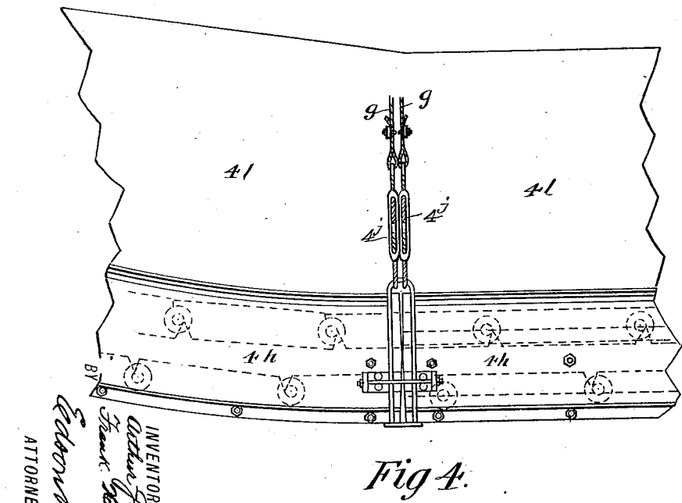
Fig. 4 is a side elevation of a fragment of the suspended length of the conveyer-track, illustrating conveyer-pans by dotted lines.
Figure 4A:
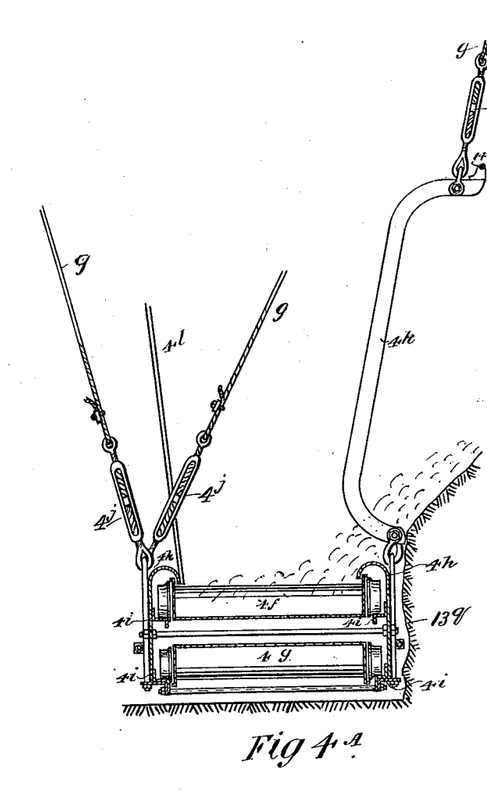

Our endless conveyer, with its wheeled axles 4$^b$, is supported by rails 4$^i$, forming two tracks, on the upper of which the receiving and loaded side or length of the conveyer is designed to travel, while the empty inverted side or length of the conveyer travels on the lower track, as indicated in Fig. 4$^A$, which represents a transverse section through a part of the conveyer and track suspended within the excavation and lying adjacent to the foot of the sloping end face of the excavation. The suspended part of the conveyer-track consists of vertically-disposed lengths of side plates 4$^h$ and four rails or angle-bars forming the rails 4$^i$, said plates and rails being united and braced together in a substantial manner. Two of the rails 4$^i$ are fastened to the opposing faces of the plates 4$^h$, at or near the lower edges thereof, to form the lower conveyer-track and the other two rails are fastened to the opposing sides of said plates 4$^h$ at a suitable distance above the lower rails and in substantially the same horizontal plane, so as to form the upper track. (See Fig. 4$^A$.) These plates 4$^h$ are curved or rolled inwardly, as shown by Fig. 4$^A$, and said plates thus serve to house or inclose the tracks and the flanged wheels of the conveyer in a manner to exclude dirt from getting into the working parts of the conveyer while it is being loaded by the descending soil loosened from the slope of the excavation, thereby preventing clogging of the working parts of the conveyer. The part of the conveyer-track lying close to the bottom and along the sloping sides of the excavation is suspended or hung from the truss 1 by any suitable form of suspension devices, one form of which consists of cables or ropes 9, arranged and attached to the truss in a manner to reduce swaying of the conveyer and its track to a minimum. The portion or length of the conveyer suspended within the excavation has the upper and lower tracks $4^i$, carried by the dirt-excluding plates $4^h$, to which the suspension-cables 9 are attached by the turnbuckles $4^j$, and these shield-plates $4^h$ and the rails $4^i$ within the lines of the excavation are constructed in lengths corresponding to panels of the truss, the joints between the lengths of the track-rails and between the lengths of the shield-plates being constructed to permit the variation in level and grade similar to common railway-tracks. The adjustment vertically of the suspended length of the track and conveyer within the lines of the excavation, due to changes in the grade or depth of the excavation, is accomplished in the following manner: When it is desired to lift the track and conveyer, lifting-jacks are placed beneath the joints of the shield-plates and the track-rails and said jacks are operated to raise the track the requisite height, and the suspension-cables are shortened by manipulating the turnbuckles $4^j$, which secure the nicety of adjustment, as may be required, or a fresh hitch may be taken in the suspension-cables if the turnbuckles cannot be adjusted the required distances.

For that portion of the path of the conveyer lying outside of the lines of the excavation the shield-plates $4^h$ are not necessary and the rails $4^i$ are placed to gage and position in any substantial manner and properly attached to the structure of the truss and its cantaliver-arms. The variation in length of the tracks due to raising or lowering the adjustable length within the excavation is compensated by making the rails $4^i$ telescopic or slidable on each other at the points where the adjustable lengths of the rail join the fixed track at or near the side margins of the excavation. Near the ends of the cantaliver-arms of the truss 1 the rails forming the lower conveyer-track curve or incline away from the rails of the upper conveyer-track to lead the conveyer properly to the lower side of the end sprocket-wheels 10.

In an apparatus for carrying out the method disclosed in United States Letters Patent No. 532,679 the truss 1 is moved lengthwise of the line of the excavation to adjust the conveyer in a manner to bring the suspended lengths of the conveyer-track and the traveling conveyer lying within the lines of the excavation adjacent to the vertical face at the foot or base of the sloping end face of said excavation, as described in said patent and as indicated by Fig. $1^B$, in which figure the reference-character $13^q$ indicates the vertical face at the base or foot of the sloping end face and the shaded prism $13^m$ indicates the contained material to be excavated by plowing the end face, the material thus loosened rolling down the slope and depositing itself upon the pans $4^a$ of the conveyer 4, the latter traveling in a direction transversely across the axial line of the excavation and depositing the loosened material loaded thereon upon a dump situated beyond one side of the excavation.

In Figs. $1^A$, 5, and $5^A$ of the drawings we have illustrated one type of plow and the means for drawing the same across the end face in lines or furrows which are practically parallel to the length of the conveyer and in which the successive benches or furrows are practically parallel to each other, said power haulage appliances for the plow being under manual control to adjust the plowing-cable at variable distances from the suspended length of the conveyer within the lines of the excavation. The plow 13 (shown by Fig. 5) is similar in action to the common grading-plow, but it differs therefrom in that it comprises right and left hand shares and moldboards, which are placed back to back on a single frame and are combined with a common landside. This plow is adapted to be hauled in either direction without turning it around at the end of the furrow, because one share excavates the soil when the plow is drawn in one direction, and the other share excavates when the plow is drawn in the reverse direction across the slope, the moldboards being set to hurl the soil over the brink of the furrow and down the slope, where it is deported by gravity and is intercepted by the conveyer 4. The plow and its hauling-cable $13^b$ has a range over the entire sloping end face of the excavation from side to side and from the top to the foot of said end face, as will be presently described, and because of the changes in the range of the plow and the different points of attachment to the plow-beam of the chains which connect the plow to the haulage-cable $13^b$ it is impracticable to employ ordinary plow-handles for steering the plow in its progress. We have, however, provided the plow with steering-bars $13^p$, which are attached at suitable intervals to the plow-beam and extend vertically therefrom in position to be grasped by the men who may walk on the slope above the line of the furrow in process of excavation by the plow or who may ride upon the plow-beam, as desired. To the upper end of one of the vertical steering-handles, preferably the middle one, is attached a line $13^t$, designed to be grasped by a man walking on the surface abreast of the plow, whereby the men manipulating the steering-handles and the line $13^t$ may steer the plow with the requisite degree of nicety.

Figures 5, 5A, 5B, 5C:
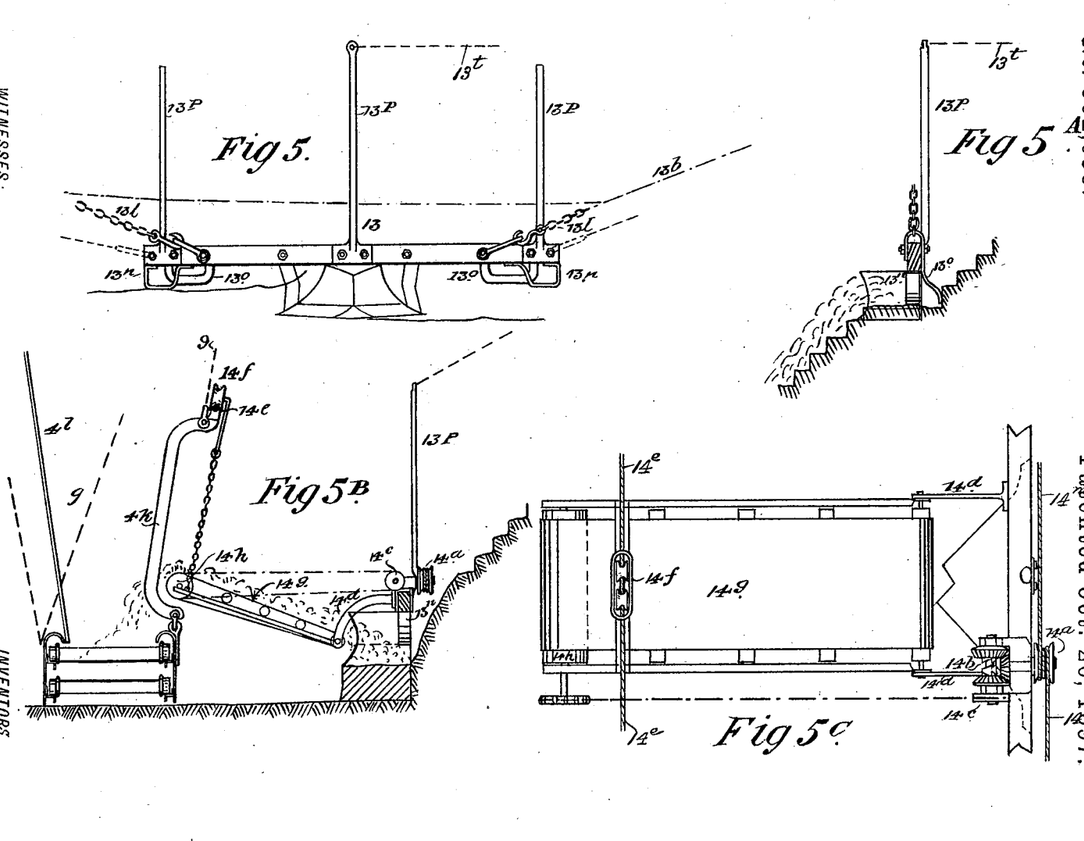
Fig. 5 is a side elevation, on an enlarged scale, of one of the plows.

To regulate the depth of penetration of the plowshare, we have provided the shoes $13^n$, one of which is attached to either end of the plow-beam and is adapted to ride on the ground to regulate the plow vertically in the passage of its share through the soil. To assist in steering the plow and holding it against lateral deflection while in transit across the slope in paths below the top surface, the lateral shoes $13^o$ are provided. These shoes $13^o$ are attached to the side of the plow-beam above the landside and at points somewhat in rear of the depth-regulating shoes $13^n$, and said shoes $13^o$ project laterally a suitable distance from the plow-beam to adapt them to ride against the vertical face or side of the previously-formed furrow or "bench" in the manner indicated by Fig. $5^A$ of the drawings. It will be seen that the two sets of shoes $13^n$ and $13^o$ contribute to the regulation of the plow, both vertically and laterally, in its transit in either direction across the sloping end face, and that the laterally-extending shoes $13^o$ ride against and utilize the previously-formed furrow in directing the horizontal position relatively to and parallel with the furrows or benches.

The haulage-cable $13^b$ which we employ for operating the plow in attacking the end face of the excavation is operated by engine $13^a$, mounted on a car adapted to travel on one of the tracks. (See Fig. $1^A$.) This cable $13^b$ is continuous or endless, and it is rigged as follows: Several wraps are made around a spool or drum $13^e$, coupled to the engine $13^a$. From this drum the cable $13^b$ passes around a sheave $13^f$, thence to and around sheave $13^g$, thence around sheaves $13^h$ and $13^i$, thence to and around sheave $13^j$, and thence around sheave $13^k$ back to the power-spool $13^e$. It will be observed that the guide-sheaves $13^f$, $13^g$, $13^j$, and $13^k$ are mounted on one side of the truss 1, next to or facing the end slope of the excavation, that the guide-sheaves $13^f$ and $13^k$ are arranged quite close together and in line with the power-drum $13^e$, and that the guide-sheaves $13^g$ and $13^j$ are arranged on the truss beyond the cars 5 5, which carry the truss. The guide-sheaves $13^h$ and $13^i$ are situated in advance of the truss and on opposite sides of the sloping end face of the excavation. These guide-sheaves $13^h$ and $13^i$ are mounted or carried by any suitable devices and in a way to adapt them to move toward or from the truss and the conveyer for the purpose of guiding the cable $13^b$ and the plow hitched thereto in paths across the end slope parallel to the truss and the conveyer, but at variable distances therefrom, according as the plow is excavating at the top, middle, or foot of the end slope, or in paths intermediate between the top surface of the ground and the bed of the excavation. These adjustable guide-sheaves $13^h$ $13^i$, which are movable relative to the truss and conveyer, are kept practically in line with each other and controlled by the engineer through the medium of a controlling-cable $13^c$ and $13^d$, the line $13^d$ being connected with the guide $13^i$ and cable $13^c$ being connected with the guide $13^h$ and leading around sheaves $13^r$ and $13^s$ to a separate drum operated by the engine $13^a$. The engineer by operating the drum for the controlling-cables $13^c$ and $13^d$ to wind up or uncoil the said cables $13^c$ and $13^d$ can at all times control the position of the guides $13^h$ $13^i$ and thus regulate the distance of the hauling-cable $13^b$ from the truss and conveyer. It is necessary that the direction of the plowing-cable shall be approximately along the line of the furrow being plowed at the time, and this is readily accomplished by slackening or taking up the controlling-cables $13^c$ and $13^d$, which adjust the guides $13^h$ and $13^i$.

The described arrangement of the haulage-cable $13^b$ permits all the work of plowing of the end slope without any modification in the length of said cable. By properly proportioning the distance of the outside sheaves $13^g$ and $13^j$ from the center line or axis of the excavation to the desired slope and depth of the end face a certain length of the cable $13^b$ will enable the plow to command with sufficient accuracy the whole end face. It is to be observed that when the plow is attacking the end face near the bottom of the slope the cable $13^b$ is drawn down into the excavation and the sheaves $13^h$ and $13^i$ are moved inward toward the truss and conveyer, but when the plow is excavating at or near the surface of the ground the cables $13^c$ and $13^d$ are operated and the sheaves $13^h$ and $13^i$ are moved away from the conveyer and truss.

When the work of the plow lies near the surface and the haulage-cable $13^b$ takes a direction almost parallel to the line of the furrow, the chains $13^l$ are hitched to the end of the plow-beam, as shown by dotted lines in Fig. 5, but as the plow descends deeper into the excavation the chains $13^l$ are attached to clevises back from the end of the plow-beam, as shown by Fig. 5.

Our apparatus—that is, the truss and conveyer carried thereby—is designed to be advanced in the general direction of the line of the excavation by power appliances operated from the engine $9^a$, so as to adapt the conveyer to take a new position at the foot or base of the next contained prism of material to be excavated from the end slope. In the preferred embodiment of this mechanism for advancing the truss and conveyer we prefer to utilize the plow-haulage cable or line $13^b$, which is used in conjunction with the plowing-engine $9^a$ and with blocks and tackle fastened from front end of the cars to points on the tracks 6 6 in advance of said cars. The haulage-cable and blocks and tackle are so adjusted that as the engine $9^a$ draws or pulls on the cable the truss is advanced the required distance to adapt the suspended length of conveyer to take a new position at the foot of the new face or prism of contained material to be excavated from the sloping end face.

In Fig. $6^A$ of the drawings we have shown one arrangement of the block-and-tackle appliances whereby the truss and conveyer may be moved either forward or backward in the general direction of the line of the excavation. We use four anchors or "deadmen" 20, which are arranged as shown by Fig. $6^A$, two of the anchors being arranged in advance of the cars 5 and two situated in rear of the cars. Each anchor has a sheave 21 attached thereto, and four lines 22 are attached to the ends of the cars and led around the sheaves 21 of the anchors. When it is desired to move the truss, the plow 13 is detached from the haulage-cable 13ᵇ, and one or the other of the two lines 22 on the left-hand side of the truss shown by Fig. 6ᴬ is attached to or connected with the plow-cable 13ᵇ, according as it is desired to move the truss and conveyer forward or backward. At the other or right-hand end of the truss one of the two lines 22 is wrapped or coiled several times around a spool or "nigger-head" 23 upon a shaft connected with the engine 13ᵃ, which engine has heretofore been referred to as the plow-cable-operating engine. The nature of the bearings or supports 7 8 for the truss is such that it is not essential to move both ends simultaneously, but said truss may be moved in any order desired.

In the process of excavating the soil at the sloping end face a point is reached at the foot or base of the slope where the excised material cannot be deported and loaded by gravity upon the endless primary conveyer 4. At this time, and to meet the requirements for depositing the material upon the primary conveyer without handling the loosened earth by manual labor, the truss and all the machinery carried thereby are run back from the end face a suitable distance—say, six feet, more or less—and we bring into service an auxiliary carrier, (shown by Figs. 5ᴮ and 5ᶜ,) which is adjusted for service between the plow 13 and the primary conveyer 4 and which is so arranged with relation to and so combined with said appliances that said auxiliary carrier receives the material loosened by the plow in cutting the end slope down to the grade of the excavation-bed, and deposits the same automatically upon the primary conveyer 4. The preferred embodiment of this auxiliary carrier mechanism contemplates the provision of an endless conveyer-apron 14ᵍ, brackets or supports 14ᵈ for pivotally attaching one end of the apron-frame to the plow-beam, a trolley 14ᵉ for supporting the opposite end of the apron-frame on the suspension devices for the primary conveyer 4, and the power devices for moving the apron 14ᵍ in one direction continuously without regard to the direction in which the plow 13 travels across the end slope of the excavation.

Before proceeding to a detailed description of the construction and mode of operation of the auxiliary carrier mechanism just referred to we deem it proper to explain that the suspension-cables 9 for sustaining the inner or receiving side of the conveyer and track, or that side next to the sloping end face, are not attached directly to the track, but these cables are connected to yokes 4ᵏ, which are in turn attached to the shield-plate 4ʰ on the inner or receiving side of the conveyer adjacent to the end slope of the excavation, as shown by Figs. 4ᴬ and 5ᴮ. The yokes 4ᵏ extend a suitable distance above the conveyer to enable the descending soil to fall without hindrance upon the conveyer, and said yokes also provide a convenient means for supporting a track-like cable or rail 14ᶠ, upon which travels the wheel or wheels for the trolley 14ᵉ that sustains one end of the frame for the auxiliary carrier.

The auxiliary-carrier apron 14ᵍ passes around suitable rollers 14ʰ, journaled in the ends of a frame shown by Fig. 5ᶜ, and the roller next to the plow-beam 13 has its shaft or trunnions extended to fit into the brackets or hangers 14ᵈ, which are rigidly fastened to the plow-beam, whereby one end of the apron-frame is pivotally connected with the plow-beam. As shown, the trolley 14ᵉ has a bail-like frame in which is journaled two wheels that ride upon the cable or rail 14ᶠ, and it is also provided with a pendent chain or other pliable connection which is fastened to the end of the apron-frame that lies adjacent to the primary conveyer 4. It will thus be seen that the auxiliary carrier is attached to the plow-beam and supported over and adjacent to the primary carrier in a manner to travel with the plow as it is hauled back and forth across the end slope of the excavation, and the auxiliary conveyer is sustained in such relation to the plow and primary conveyer that the material loosened by the plow in cutting the foot of the end face down to the grade of the bed of the excavation is deposited upon one end of the auxiliary carrier, which is driven, by means presently described, to convey the material to and deposit the same upon the primary conveyer 4, by which the material is carried to one side of the excavation.

We have devised novel mechanism for automatically driving the auxiliary-carrier apron as the plow is hauled across the end slope, and this driving mechanism is capable of being reversed as the plow travels back and forth in order that the endless apron of the auxiliary carrier may always travel toward the primary conveyer 4. On the plow-beam is journaled a transverse shaft, one end of which is equipped with a friction-drum 14ᵃ and the other end of said shaft having a bevel-gear. A short shaft is journaled longitudinally on the plow-beam adjacent to the bevel-gear on the transverse shaft, and this longitudinal shaft carries two bevel-gears and a suitable clutch and shifting lever, whereby either of the bevel-gears on said longitudinal shaft may be caused to mesh with the bevel-gear on the transverse shaft. The said longitudinal shaft is operatively connected with one of the rollers of the auxiliary-carrier apron—as, for example, by means of an endless belt which passes around suitable pulleys on the longitudinal shaft and the end of the roller, as indicated by Figs. 5ᴮ and 5ᶜ. With the pulley 14ᵃ of the driving mechanism for the auxiliary-carrier apron is connected a cable 14ᵐ, which consists, preferably, of a Manila rope, several wraps of which are taken around the pulley 14ᵃ to secure the necessary frictional contact between the rope and the pulley 14ª, and this rope or cable 14ᵐ is carried across the excavation in the direction of the truss, and its ends are fastened to the truss in any suitable way. As the plow 13 is hauled in one direction across the end slope of the excavation by the power haulage-cable 13ᵇ the auxiliary carrier travels with the plow, the pulley 14ª is rotated by its engagement with the relatively stationary cable, and one of the gears on the short longitudinal shaft meshes with the transverse shaft of the pulley 14ª, which short longitudinal shaft drives the apron 14ᵍ in the proper direction to deposit the material loosened by the plow and falling upon the receiving end of the apron upon the primary carrier. When the plow reaches the end of the furrow, the shifting lever is operated to throw the other gear on the short longitudinal shaft into mesh with the bevel-gear on the transverse shaft of the pulley 14ª, and as the plow 13 is hauled in the opposite direction by the cable 13ᵇ the driving mechanism propels the auxiliary-carrier apron 14ᵍ in the proper direction to load the material upon the primary conveyer 4.

The auxiliary carrier mechanism may readily be detached when the foot of the end slope has been removed down to the grade of the canal-bed, and by pivotally attaching the apron-frame to the plow-beam the carrier mechanism adjusts or accommodates itself to the depth of the plow in its transit back and forth across the end face.

When excavating at the foot of the end slope, it is not necessary to employ the lateral guide-shoes 13°. Hence these shoes may be detached. We prefer to employ one plow when excavating the foot of the end slope, rigged with the auxiliary carrier mechanism, and another plow equipped as shown by Fig. 5 when operating at the surface or across the end slope.

To prevent the material in its rapid descent down the end slope from bounding over and beyond the carrier, we provide the conveyer 4 with the barrier-plate 4ˡ. (Shown by Figs. 4 and 4ᴬ.) This barrier-plate is attached at its lower end to the shield-plate 4ʰ on the side opposite the receiving side of the conveyer, and it extends upwardly from the conveyer a suitable distance to intercept the descending soil. The barrier-plate 4ˡ extends a suitable distance along the suspended length of the conveyer, and it is made preferably in sections corresponding to the sections of the shield-plates 4ʰ and the conveyer-tracks 4ⁱ.

This being the construction of our apparatus the operation may be described briefly as follows: The incipient excavation is first made in any ordinary way, using ordinary excavating appliances, to obtain the bed and establish the width of the excavation for the water-course, after which the sides of the excavation are then given a form or degree of inclination toward the bed, as may be desired. A short section of the excavation is made in this manner, and then our apparatus is placed in position by laying the tracks 6, placing the cars thereon, assembling and erecting the truss, adjusting the conveyer appliances 4, and rigging the plowing mechanisms across the end face of the excavation, said end face having a slope greater than the natural angle of repose of the material. Previous to excavating, the truss is moved to bring the conveyer adjacent to the vertical face at the foot or base of the end slope, and then the plow is drawn back and forth across the end face, the controlling-cables 13ᶜ and 13ᵈ being let out from time to time as the plow goes farther down the end slope and deeper into the lines of the excavation. The material loosened by the plow in its travels across the end slope is hurled over the brink of the furrow and falls by gravity down the end slope and upon the primary conveyer 4, which conveys the material transversely across the line of the excavation and deposits it upon a dump 3. When the contained prism of material (indicated at 13ᵐ in Fig. 1ᴮ) has been excavated and the plow reaches a point at the foot of slope, where the loosened material does not lie above the level of the conveyer, the truss and its contained parts are moved back from the end face a distance, approximately six feet, and the auxiliary carrier mechanism and its plow are brought into service for the purpose of excavating the foot or base of the end slope down to grade of the bed of the excavation, and the material thus loosened is deposited by the auxiliary carrier upon the primary conveyer 4, which transports it out of the excavation. When the operation of cutting the end face down to grade and of establishing a new vertical face to the new sloping end face if completed, the auxiliary carrier mechanism and plow are disconnected, the truss is again moved forward to bring the conveyer adjacent to the newly-established vertical face of the end slope, and the operation of plowing is again commenced at the top surface of the ground.

Parts of our apparatus may be used without the whole. For example, the truss and conveyer may be employed without resorting to the use of the plowing devices on the auxiliary carrier mechanism, in which case the conveyer may be adjusted laterally adjacent to the end slope for the purpose of loading it automatically by making the conveyer intercept the material dislodged in any suitable way from the end slope of the excavation, or the conveyer may be loaded by manual labor at any point within the lines of the excavation. Again, the conveyer may be loaded by power-operated appliances, such as the auxiliary conveyer, or other appliances may be devised and used for the purpose of loading the conveyer, nor is our apparatus to be used solely in connection with excavations for water-courses, as the plowing appliances or the auxiliary conveyer appliance may be used separately or together in connection with the conveyer for doing general excavation-work.

We are aware that different types of conveyer appliances may be used and that changes in the details of construction and in the arrangements of parts herein shown and described as the preferred embodiment of our invention may be made by a skilled mechanic without departing from the spirit or sacrificing the advantages of our invention, and we therefore reserve the right to make such modifications and alterations as fairly fall within the scope of our invention.

Having thus fully described our invention, what we claim as new, and desire to secure by Letters Patent, is—

1. In an apparatus for making artificial excavations, the combination of a truss provided with a cantaliver arm or arms, a continuous track partially suspended from the truss and partially attached in fixed relation to the truss and its cantaliver arm or arms, and a traveling conveyer supported by said continuous track, as and for the purposes described.

2. In an apparatus for making artificial excavations, the combination of cars carrying roller-supports, a truss resting on said roller-supports and pivotally attached to opposite ends of said cars, and a conveyer carried by said truss, as and for the purposes described.

3. In an apparatus for making artificial excavations, the conveyer having the articulated pans, the links or eyebars arranged in pairs on opposite sides of the pans, and wheeled axles connected with said pans and with the links or eyebars, combined with a sprocket-wheel having bearings for the axles or wheels of the conveyer, as and for the purposes described.

4. In an apparatus for making artificial excavations, the combination with a truss, of a conveyer-track suspended for a portion of its length from said truss and having its remaining portion attached, in fixed relation, to the truss and its cantaliver arm or arms; the suspended portion of the conveyer-track consisting of lengths of shield-plates and rails which are sustained by adjustable suspension devices, and a conveyer adapted to the rails of said conveyer-track, as and for the purposes described.

5. In an apparatus for making artificial excavations, the combination with a truss, of a conveyer and its track which conform to the lines of the excavation; the portion of the track outside of the lines of the excavation being sustained on the truss and its cantaliver arm or arms in fixed relation thereto, and the portion of said track within the lines of the excavation consisting of lengths of shield-plates and rails which are adjustable vertically by the employment of suspension devices attached to the truss; the rails on the fixed and adjustable portions of said track being slidably and telescopically joined at or near the side margins of the excavation, as and for the purposes described.

6. In an apparatus for making artificial excavations, the combination with a truss, of a conveyer-track, yokes attached to the track on the landside of the conveyer-track, cables attached to the yokes and conveyer-track and to the truss, and a conveyer adapted to said track, as and for the purposes described.

7. In an apparatus for making artificial excavations, the combination with a truss, a conveyer-track suspended therefrom and carrying an endless conveyer, and a barricade carried above the conveyer-track at the side opposite thereof from the receiving or loading side of said conveyer, as and for the purposes described.

8. In an apparatus for making artificial excavations, the combination of a truss, its driving mechanism, a conveyer carried by said truss and adapted to be adjusted thereby adjacent to an end slope of an excavation, a plowing or excavating appliance, and power devices for moving said plowing or excavating appliances across the end slope, for the purpose described, substantially as set forth.

9. In an apparatus for making artificial excavations, the combination of a truss, a conveyer, a plowing or excavating appliance, power devices for moving said plowing or excavating appliances, and means for controlling the plowing and power devices to give the plowing appliances range over the entire end slope of an excavation, as and for the purposes described.

10. In an apparatus for making artificial excavations, the combination with a truss, a conveyer, and an engine or engines, of a set of guide devices certain of which are carried on the truss while other guides are movable toward or from said truss, a haulage-cable adapted to said guides, a plow connected to said haulage-cable, and means for changing the position of the adjustable guides relatively to the truss, as and for the purposes described.

11. In an apparatus for making artificial excavations, the combination with a truss and a conveyer, of an engine, guide-sheaves on the truss and substantially in line with the engine, other guide-sheaves supported on the truss beyond the first-named guide-sheaves, movable guides lying in advance of the truss and operatively connected with a controlling cable or line, a continuous haulage-cable operated by the engine and adapted to the truss-guides and the movable guides, and a plow adapted to be connected with the haulage-cable, as and for the purposes described.

12. In an apparatus for making artificial excavations, the reversible plow having the oppositely-facing shares and a landside common to both shares, as and for the purposes described.

13. In an apparatus for making artificial excavations, a reversible plow provided with lateral shoes adapted to ride against a furrow to assist in guiding the plow, as and for the purposes described.

14. In an apparatus for making artificial excavations, the combination with a haulage-cable, of a reversible plow having oppositely-facing shares to a common landside, the two sets of shoes, and steering-handles extending upwardly from the beam, as and for the purposes described.

15. In an apparatus for making artificial excavations, the combination of a truss adapted to span an excavation, a primary conveyer carried by said truss to be adjusted thereby adjacent to an end slope and adapted to be loaded by the deportation of material loosened from said end slope, an excavating appliance for removing the material at the foot of the slope to bring the latter down to the grade, and an auxiliary carrier for depositing the material on the primary carrier, as and for the purposes described.

16. In an apparatus for making artificial excavations, the combination with a truss and a primary conveyer, of a reversible plow, an auxiliary carrier movable with said plow, and a reversible drive-gear for driving said auxiliary carrier toward the primary conveyer, as and for the purposes described.

17. In an apparatus for making artificial excavations, the combination with a truss and a primary conveyer, of a reversible plow, an auxiliary carrier traveling with said plow, a relatively fixed cable, rope, or chain and a reversible drive-gear having a shaft connected with the said cable, rope or chain and another shaft geared to the carrier, for the purposes described, substantially as set forth.

18. In an apparatus for making artificial excavations, the combination with a truss and a primary conveyer, of a reversible plow, an auxiliary carrier having its frame pivotally attached to said plow, a trolley connected with the opposite end of said frame for the auxiliary carrier, a reversible drive-gear, and a rope or cable engaging with said drive-gear, as and for the purposes described.

19. In an apparatus for making artificial excavations, the combination with a truss, of a primary conveyer, suspending devices having yokes attached to the conveyer-track, a track-like cable or rail supported by the yokes, a plow, and an auxiliary carrier partly supported by said plow and having a trolley adapted to the track-like cable or rail, substantially as and for the purposes described.

20. In an apparatus for making artificial excavations, a conveyer consisting of a series of pans articulated together at their contiguous ends by transverse dirt-excluding joints, wheeled axles fitted in said joints of the pans and protected thereby from lodgment of dirt, and strands of connecting links or bars fitted in pairs on said axles and arranged on opposite sides of the wheels thereon, as and for the purposes described.

21. The combination with a track, a reversible conveyer sustained by said track to travel in either direction back and forth thereon and consisting of a series of pans articulated together by rolls interlocking by curvature in the same direction and forming dirt-excluding joints between the contiguous ends of said pans, and wheeled axles journaled in said dirt-excluding, articulated joints of the pans, as and for the purposes described.

22. The combination with a conveyer-track, of a reversible conveyer having a series of pans articulated together by hook-like rolls interlocking by curvature in the same direction and forming dirt-excluding joints between the contiguous edges of said pans, and wheeled axles passing through the hook-like rolls and fitted to said track, whereby the spaces between the pans are closed against the lodgment of dirt upon the edges of the pans and the axles of the conveyer, as and for the purposes described.

23. The combination with a track, of a reversible conveyer adapted to travel back and forth on said track and comprising a series of pans each wider at one end than at the other and with the bottom of said pan curved upon itself into the hook-like cylindrical rolls, said rolls at the ends of each pan interlocking with rolls curved in the same direction on the ends of adjacent pans and forming articulated joints which exclude lodgment of dirt between the edges of the pans, and wheeled axles for sustaining the conveyer on said track, as and for the purposes described.

24. In an apparatus for making artificial excavations, the combination of a truss carried on trucks to span an excavation, a conveyer-track having a certain length thereof suspended from the truss within the lines of the excavation and composed of suspended shield-plates and rails attached within said shield-plates, and an endless pan and wheeled conveyer arranged between said shield-plates to expose its pans and having its wheels fitted to the tracks to be protected by the plates against lodgment of dirt, whereby the suspended length of the conveyer is arranged to intercept the material dislodged from the end slope of an excavation, as and for the purposes described.

25. In an apparatus for making artificial excavations, the combination of a truss carried at its ends by trucks and arranged to span an excavation, a conveyer-track having a certain section thereof composed of lengths of spaced, parallel shield-plates, which are suspended from said truss within the lines of the excavation, and lengths of rails fixed on the opposing faces of said shield-plates to be sustained thereby and protected against accumulation of dirt, and a pan-conveyer having wheels fitted to said rails on the suspended plates to sustain the conveyer in position for its pans to intercept the material dislodged from an end slope of the excavation, as and for the purposes described.

26. In an apparatus for making artificial excavations, the combination of a truss carried by trucks and arranged to span an excavation, a conveyer-track suspended for a part of its length from said truss within the lines of the excavation and consisting of a pair of parallel, continuous shield-plates which are joined together and are provided at their upper ends with the inwardly-extended guards and the track-rails fixed to the opposing faces of the shield-plates and arranged below the guards thereof, and a conveyer having wheeled axles adapted to the rails and shielded by the plates and the guards thereof from material to be loaded on the conveyer, as and for the purposes described.

27. In an apparatus for making artificial excavations, the combination of a truss supported by trucks and arranged to span an excavation, a conveyer partly carried by the truss and partly suspended therefrom within the lines of an excavation and presented thereby laterally adjacent to the sloping end face of the excavation, and a plow with operating means therefor to direct the plow across the sloping end face of the excavation in a direction generally parallel to the truss and the conveyer, for the purposes described, substantially as set forth.

28. In an apparatus for making artificial excavations, the combination of a truss carried by trucks and arranged to span an excavation, a conveyer carried by said truss, with a certain length of said conveyer suspended within the lines of the excavation and presented laterally adjacent to the sloping end face of the same, a haulage-cable guided to travel over the end slope of an excavation in a general direction parallel to the truss and to the conveyer, and a reversible plow connected to said haulage-cable, as and for the purposes described.

29. In an apparatus for making artificial excavations, the combination with a haulage-cable, of a reversible plow connected to said cable and provided with oppositely-facing shares, a landside common to both shares, and shoes extending laterally from the landside of said plow to assist in guiding the same, as and for the purposes described.

30. In an apparatus for making artificial excavations, the combination with a haulage-cable, of a reversible plow connected to said cable and provided with vertical steering-bars which are fastened to the plow-beam and are adapted to be grasped by a man riding on said beam, for the purpose of steering the plow by rocking it in a plane across the line of the cut or furrow, as and for the purposes described.

31. In an apparatus for making artificial excavations, the combination of a truss provided with a cantaliver-arm and supported on trucks to span an excavation, a primary conveyer carried by said truss and its cantaliver-arm and having a section or length thereof suspended from said truss within the lines of the excavation and adjacent to the sloping end face thereof, a plow guided to operate across said end of slope of the excavation in a general direction parallel to the line of the truss and said primary conveyer, and an auxiliary carrier between said plow and primary conveyer and arranged to travel with said plow in operative relation to the plow and primary conveyer, to deposit the material loosened by said plow upon the primary conveyer, as and for the purposes described.

32. In an apparatus for making artificial excavations, the combination of a truss provided with a cantaliver-arm and supported on trucks to span an excavation, a primary conveyer carried by said truss and its cantaliver-arm and suspended for a part of its length within the lines of an excavation, an excavator appliance guided to travel in a direction generally parallel to the line of the truss and conveyer, and an auxiliary carrier coupled at one end to said excavator appliance and having traveling contact with said primary conveyer, for the purposes described, substantially as set forth.

33. In an apparatus for making artificial excavations, the combination of a truss provided with a cantaliver-arm and supported on trucks to span an excavation, a primary conveyer carried for a part of its length by the truss and its cantaliver-arm and suspended for its remaining length from the truss within the lines of an excavation, a reversible plow guided to travel in a direction generally parallel to the line of said truss and primary conveyer, an auxiliary carrier pivotally connected with said plow and having traveling contact with devices on said truss or primary conveyer, and a reversible driving mechanism whereby the auxiliary carrier may be driven at all times toward the primary conveyer as the plow travels back and forth, as and for the purposes described.

34. In an apparatus for making artificial excavations, the combination of a truss provided with a cantaliver-arm and supported on trucks to span an excavation, and an endless primary conveyer carried for a part of its length on said truss and its cantaliver-arm and suspended for the remaining portion of its length from the truss within the lines of an excavation, the length of said conveyer lying within the excavation being housed between and within lengths of shield-plates which are suspended from the truss and are arranged laterally adjacent to the end slope of the excavation, for the purposes described, substantially as set forth.

35. In an apparatus for making artificial excavations, the combination of a truss carried by trucks to span an excavation, an endless conveyer suspended from said truss within the lines of the excavation, a haulage-cable guided by devices to travel in a direction generally parallel to the line of the truss and conveyer, and a reversible or double-ended plow connected to said haulage-cable, for the purposes described, substantially as set forth.

36. In an apparatus for making artificial excavations, the combination of a truss having a cantaliver-arm and supported on trucks to span an excavation, a primary conveyer partly carried by the truss and its cantaliver-arm and partly suspended from said truss within the lines of the excavation, means for advancing said truss and conveyer laterally with respect to a sloping end face of the excavation, mechanism for impelling said conveyer in a direction at right angles across the line of the excavation and in the direction of the length of the excavation, and an auxiliary conveyer supported and operating in a plane substantially at right angles to the plane of movement of the primary conveyer, for the purposes described, substantially as set forth.

37. In an apparatus for making artificial excavations, the combination of a truss provided with a cantaliver-arm and supported on trucks to span an excavation, a primary conveyer carried for a part of its length on the truss and its cantaliver-arm and suspended for the remainder of its length from said truss within the lines of an excavation, an excavating appliance guided by means substantially as specified to travel in a direction generally parallel to the line of the truss and primary conveyer, and mechanism intermediate between the excavating appliance and said primary conveyer for depositing the excised material upon said conveyer, for the purposes described, substantially as set forth.

38. The combination of a truss carried by trucks to span an excavation and presented laterally to a sloping end face thereof, an engine or motor, a plowing appliance, a haulage-cable arranged across said end slope of the excavation substantially parallel to the line of the truss and adapted to be propelled by said engine to haul the plowing appliance across the end face of the excavation, and mechanism whereby the haulage-cable may be employed to move the truss laterally and in the general direction of the line of the excavation, as and for the purposes described.

In testimony whereof we affix our signatures in presence of two witnesses.

ARTHUR JOHN MASON.
FRANK KRYDER HOOVER.

Witnesses:
JOSEPH W. HOOVER,
C. E. KOONS.